Patented Sept. 14, 1954

2,689,174

UNITED STATES PATENT OFFICE 2,689,174

HERBICIDES

Jonas Kamlet, Easton, Conn., assignor to Mathieson Chemical Corporation, a corporation of Virginia No Drawing. Application October 17, 1952,
Serial No. 315,407

2 Claims. (Cl. 71—2.7)

This invention relates to my discovery that the water-soluble salts of methylene-bis-(iminosulfonic) acid have value as herbicides and to means for their utilization in herbicidal compositions.

The water-soluble salts of methylene-bis-(iminosulfonic) acid may be represented by the generic formula:

$$MOSO_2NH \cdot CH_2 \cdot NHSO_2OM$$

where M is a water solubilizing cation. Included among these salts are the sodium, calcium, potassium, ammonium and magnesium salts; the mono-, di-, or tri-alkylamine salts, such as the methylamine, dimethylamine, trimethylamine, ethylamine, diethylamine and triethylamine salts; the mono-, di-, or tri-alkanolamine salts, such as the monoethanolamine and diethanolamine salts; the pyridine, picoline, lutidine, morpholine, ethylene diamine salts, quaternary ammonium salts (such as tetramethyl ammonium salt) and the like. They may be prepared by the condensation reaction of formaldehyde with a water-soluble salt of sulfamic acid or by reaction of formaldehyde with sulfamic acid followed by neutralization with an organic or inorganic base. In addition, the ammonium salt may be prepared by reaction of hexamethylene tetramine with sulfamic acid and ammonium sulfamate. The compounds are ordinarily white crystalline solids, odorless and non-volatile. They are readily soluble in water but are insoluble in organic solvents.

I have now found that the water-soluble salts of methylene-bis-(iminosulfonic) acid possess a high degree of selective herbicidal activity. The salts are effective by absorption through the foliage or root system. That is, when applied as a spray the compound is absorbed through the leaves of the plants, followed by migration of the chemical to the roots, killing the entire root system in the process. When the compounds are applied to the soil, they are absorbed through the roots thereby starving the entire plant. Of course, by application in dry form or from aqueous solution both mechanisms may operate simultaneously to kill the plants. In general, the procedures that I have found desirable to follow are those common to all translocated herbicidal agents.

According to my invention undesirable vegetation is selectively destroyed in an infested area by applying a composition comprising the water-soluble salts of methylene-bis-(iminosulfonic) acid in a concentration of about 0.5 to 15 weight per cent on the composition to the infested area. My invention includes herbicidal compositions consisting essentially of a dry finely divided herbicidally active or inactive carrier powder and about 50 to about 90 weight per cent of the water-soluble salts of methylene-bis-(iminosulfonic) acid. Suitable carrier powders are, for example, talc, bentonite, pyrophyllite, calcium carbonate, dusting sulfur, 2,4-dichlorophenoxy acetate salts, 2,4,5-trichlorophenoxy acetate salts, ammonium thiocyanate and sodium arsenite. Thus suitable compositions of my invention may contain, for example 75 per cent by weight of ammonium methylene-bis-(iminosulfonate), 20 per cent bentonite, and 5 per cent DDT. For dusting purposes the compositions may be used full strength or, advantageously, they may be diluted to an active ingredient concentration as low as about 5 per cent by weight. When sprayed on plants, the salts are advantageously in aqueous solution containing about 0.5 per cent to about 5 per cent active ingredient. It is also advantageous to add a wetting agent to the aqueous solution to insure good contact of the spray with the foliage of treated vegetation. Typical wetting agents include the alkyl aryl sulfonates, the fatty alcohol sulfates, sodium salts of alkyl naphthalene sulfonic acids, long chain quaternary ammonium compounds and sodium salts of petroleum-derived alkylsulfonic acids.

As stated above, the water-soluble salts of methylene-bis-(iminosulfonic) acid may be prepared by the condensation reaction of formaldehyde with a water-soluble salt of sulfamic acid or by reaction of formaldehyde with sulfamic acid followed by neutralization with an organic or inorganic base. In addition, the ammonium salt may be prepared by reaction of hexamethylene tetramine with sulfamic acid and ammonium sulfamate. In each case proportions of the synthesis reactants are critical to formation of the methylene-bis-(iminosulfonic) acid salts. By the condensation reaction route, one mole of formaldehyde, or a formaldehyde-yielding compound such as paraformaldehyde or trioxane, is reacted with two moles of a water-soluble sulfamic acid salt. For example, where the salt is ammonium sulfamate, diammonium methylene-bis-(iminosulfonate) is formed by the following reaction:

$$HCHO + 2NH_2SO_2ONH_4 \rightarrow \\ NH_4OSO_2NH \cdot CH_2 \cdot NHSO_2ONH_4 + H_2O$$

Where the free acid is employed in synthesis, one mole of formaldehyde, or formaldehyde-yielding compound, is reacted with two moles of sulfamic acid. The resulting product, methylene-bis-(iminosulfonic) acid, is neutralized with an organic or inorganic base. The reaction goes according to the following general equations:

where M is a water-solubilizing cation. Another method comprises reacting one mole of hexamethylene tetramine with four moles of sulfamic acid and eight moles of ammonium sulfamate to prepare di-ammonium methylene-bis-(iminosulfonate). This equation illustrates the reaction:

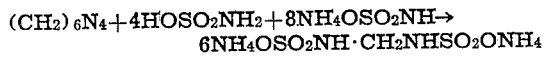

The following methods illustrate preparation of typical water-soluble salts of methylene-bis-(iminosulfonic) acid.

METHOD A 115 grams of ammonium sulfamate (1 mole) was dissolved in 200 cc. of warm water and 37.5 cc. of 40 per cent formaldehyde solution (0.5 mole) was added. The reaction mixture was then maintained at 50°–60° C. for two hours, after which it was evaporated under reduced pressure to dryness. There was thus obtained an almost quantitative yield (119 grams) of the ammonium salt of methylene-bis-(iminosulfonic) acid.

METHOD B 196 grams of sulfamic acid (2 moles) was dissolved in 400 cc. of boiling water and 75 cc. of 40 per cent formaldehyde solution (1 mole) was added. The reaction mixture was neutralized with 200 cc. of 40 per cent sodium hydroxide solution (2 moles) and evaporated to dryness under reduced pressure. There was thus obtained a quantitative yield of 248 grams of di-sodium methylene-bis-(iminosulfonate).

METHOD C 392 grams of sulfamic acid (4 moles) was dissolved in 1 liter of boiling water, and 141 grams of hexamethylene-tetramine (1 mole) was added. The reaction mixture was boiled under gentle reflux for a few minutes, a solution of 920 grams of ammonium sulfamate (8 moles) in 2 liters of water was added, and the reaction mixture was then boiled under gentle reflux for one hour. The reaction mixture was evaporated to dryness under reduced pressure. There was thus obtained 1370 grams of di-ammonium methylene-bis-(iminosulfonate), equivalent to a yield of 95 per cent of the theoretical.

An identification of the compounds was made on the basis of nitrogen determinations (by the Kjeldahl method) and by carbon determinations. Thus, di-ammonium methylene-bis-(iminosulfonate) showed the following analysis:

|  | Theoretical | Found |
| --- | --- | --- |
| Percent Nitrogen | 23.3 | 23.5 |
| Percent Carbon | 5.0 | 4.92 |

This was considered to be excellent agreement. For example, $CH_2:NSO_2ONH_4$, while it will show a 22.3 per cent nitrogen content, has a carbon content of 9.52 per cent or almost twice as much as does the di-ammonium methylene-bis-(iminosulfonate). Ammonium sulfamate, of course, has no carbon. In other words, while good nitrogen content agreement was obtained, the critical analysis was that of carbon, and these results are considered satisfactorily close to the theoretical.

The water-soluble salts of methylene-bis-(iminosulfonic) acid are inexpensive to use and offer a very satisfactory means for selectively killing undesirable vegetation. The salts are noncorrosive to metallic equipment in which they may be handled and, in fact, actually tend to act as an inhibitor of corrosion. They are particularly desirable since application may be made without the danger of sterilizing the soil for long periods of time. Upon prolonged exposure the compounds are hydrolyzed in the soil to form ammonium sulfate and innocuous organic residues. Although water soluble, the salts are not readily leachable and are easily retained by the soil. The salts have a relatively high molecular weight and hence have a lower osmotic pressure in solution. Consequently, there is no tendency to dry out or dehydrate plants or grasses upon which the compounds do not act, i. e., desirable vegetation, but with which they are contacted because of proximity to weeds being treated.

The following examples illustrate the effectiveness of the water-soluble salts of methylene-bis-(iminosulfonic) acid in treating vegetation.

Example I

Plots of 200 square feet in area were selected containing a variety of weeds with poison ivy predominating. Sprays containing 0.5 pound of ammonium methylene-bis-(iminosulfonate) per gallon were applied at the rate of 1 gallon per 100 square feet. In 3 days, severe injury of the poison ivy was noted, with the leaves showing a glazed appearance. In 2 weeks the poison ivy was completely dead and all of the weeds shrivelled up. None of the weeds reappeared by the end of the season although a good growth of grass appeared in the meantime.

Example II

A 6 foot by 6 foot plot of ground heavily infested with poison ivy was sprayed with a solution of ammonium methylene-bis-(iminosulfonate) at the rate of 200 lbs. per acre (i. e. 2.25 gm. per square foot) applied as a 1 per cent solution, using 0.05 per cent of sodium kerylbenzene sulfonate as a wetting agent to facilitate absorption. In three days marked epinasty was noted. In seven days the weeds were severely damaged and in ten days they were dead. No evidence of reappearance was noted in thirty days.

Example III

A 6 foot by 8 foot plot of scrub land heavily infested with quackgrass was treated with a solution of ammonium methylene-bis-(iminosulfonate) in the manner described in Example II. In three days marked epinasty was noted. In eight days the weeds were severely damaged and in nine days they were dead. No evidence of reappearance was noted in thirty days.

Example IV

A plot of land 50 square feet in area was found covered with mixed annual weeds. This was sprayed with a 2 per cent solution of ammonium methylene-bis-(iminosulfonate) at the rate of 200 lbs. per acre. In three days, all of the weeds on the plot were dead or dying and in one week, complete killing of the weeds was noted.

Example V

Individual stands of corn (4 inches high), millet (6 inches high), wheat (5 inches high), tomatoes (5 inches high), cranberry bean (7 inches high), soybeans (5 inches high) and peach plant (6 inches high) were sprayed to run off with a one per cent solution of ammonium methylene-bis-(iminosulfonate) containing 0.05 per cent of sodium kerylbenzene sulfonate. In two days, the corn, millet, wheat, soybeans and peach plants were moderately to severely damaged, whereas the tomatoes and cranberry beans were relatively unaffected. In ten days, the corn, millet and wheat were markedly stunted, the soybeans and peaches were severely damaged and the tomatoes and cranberry beans were normal. This illustrates the selective action of the herbicides of the present invention.

This application is a continuation-in-part of my co-pending application Serial No. 180,910, filed August 22, 1950, and now abandoned.

I claim:

1. A method of selectively destroying undesirable vegetation in an infested area which comprises applying to the infested area a composition comprising a water-soluble salt of methylene-bis-(iminosulfonic) acid in a concentration of about 0.5 to 15 weight per cent on the composition.

2. A herbicidal composition comprising a water-soluble salt of methylene-bis-(iminosulfonic) acid in a herbicidal concentration and a finely divided carrier powder.

References Cited in the file of this patent

UNITED STATES PATENTS

| Number | Name | Date |
|---|---|---|
| 2,369,439 | Cupery | Feb. 13, 1945 |